US012691792B2

(12) United States Patent
Usui et al.

(10) Patent No.: US 12,691,792 B2
(45) Date of Patent: Jul. 28, 2026

(54) VEHICLE SEAT

(71) Applicant: Honda Motor Co., Ltd., Tokyo (JP)

(72) Inventors: Shogo Usui, Tokyo (JP); Koji Hashimoto, Tokyo (JP); Masakazu Okada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/966,173

(22) Filed: Dec. 3, 2024

(65) Prior Publication Data

US 2025/0242725 A1 Jul. 31, 2025

(30) Foreign Application Priority Data

Jan. 26, 2024 (CN) .......................... 202410109005.1

(51) Int. Cl.
B60N 2/00 (2006.01)
B60N 2/02 (2006.01)
B60N 2/06 (2006.01)

(52) U.S. Cl.
CPC ....... B60N 2/0026 (2023.08); B60N 2/02246 (2023.08); B60N 2/0248 (2013.01); B60N 2/065 (2013.01)

(58) Field of Classification Search
CPC .............. B60N 2/02246; B60N 2/0026; B60N 2/0248; B60N 2/065

USPC .......................................................... 701/36
See application file for complete search history.

(56) References Cited

U.S. PATENT DOCUMENTS

| | | | |
|---|---|---|---|
| 12,187,165 B2 * | 1/2025 | Ohno ..................... | B60K 35/29 |
| 2023/0234477 A1 * | 7/2023 | Ozawa ................. | B60N 2/0248 701/49 |
| 2023/0339369 A1 * | 10/2023 | Diamond ............... | B60N 2/002 |
| 2024/0001831 A1 * | 1/2024 | Lee ...................... | B60N 2/0233 |

FOREIGN PATENT DOCUMENTS

| | | |
|---|---|---|
| JP | 2010083297 | 4/2010 |

* cited by examiner

*Primary Examiner* — Yazan A Soofi
(74) *Attorney, Agent, or Firm* — JCIPRNET

(57) ABSTRACT

A vehicle seat includes a first electric device and a second electric device. The first electric device is configured to move a first electric seat to at least one of a first predetermined position and a first predetermined posture inside a vehicle. The second electric device is configured to move a second electric seat to at least one of a second predetermined position and a second predetermined posture inside the vehicle. When a predetermined condition is met, the vehicle seat controls the first electric device and the second electric device so that the first electric seat is in the at least one of the first predetermined position and the first predetermined posture and the second electric seat is in the at least one of the second predetermined position and the second predetermined posture.

2 Claims, 8 Drawing Sheets

10

12    14

First electric device    Second electric device

Vehicle seat

VEHICLE SEAT

CROSS-REFERENCE TO RELATED APPLICATION

This application claims the priority benefit of China application serial no. 202410109005.1, filed on Jan. 26, 2024. The entirety of the above-mentioned patent application is hereby incorporated by reference herein and made a part of this specification.

BACKGROUND

Technical Field

The disclosure relates to a seat, and in particular relates to a vehicle seat.

Description of Related Art

In recent years, efforts have been actively made to provide access to sustainable transportation systems for those in vulnerable positions, such as the elderly or children. In order to achieve the above-mentioned purpose, research and development are devoted to further improving the safety and convenience of traffic through developments related to the vehicle seats.

Particularly with respect to vans and light trucks, as autonomous driving becomes more prevalent, it is anticipated that the second row of seats will become electrically operated due to seating configuration requirements and other factors. When children are seated in the second row, or when the vehicle is unoccupied but carrying luggage, it may be necessary to position the second row seats as close to the driver's seat as possible, thereby sliding the second row to its foremost position. Conversely, when adult passengers are boarding, such movement is not desired. Therefore, it is necessary to detect whether there are children in the car, whether a child seat is installed, or whether there is no one in the car.

However, current membrane switches used to detect passengers cannot differentiate between adults, children, child seats and luggage.

Although Patent Document 1 (Japanese Laid Open Patent Publication No. 2010-083297) discloses that "if the driver's side rear seat is in a state that can slide rearward, the driver's side rear seat will be connected together and slide rearward," it does not teach memorizing the positions and postures of other seats.

SUMMARY

A vehicle seat is provided in the disclosure, the vehicle seat includes a first electric device and a second electric device. The first electric device is configured to move a first electric seat to at least one of a first predetermined position and a first predetermined posture inside a vehicle. The second electric device is configured to move a second electric seat to at least one of a second predetermined position and a second predetermined posture inside the vehicle. When a predetermined condition is met, the vehicle seat controls the first electric device and the second electric device so that the first electric seat is in the at least one of the first predetermined position and the first predetermined posture and the second electric seat is in the at least one of the second predetermined position and the second predetermined posture.

In order to make the aforementioned and other features and advantages of the disclosure comprehensible, embodiments accompanied with drawings are described in detail below.

DETAILED DESCRIPTION OF DISCLOSED EMBODIMENTS

Hereinafter, embodiments of the disclosure are described with reference to the drawings.

For vehicle seats, current technology cannot distinguish between adults, children, child seats and luggage. Therefore, determining the presence of passengers or objects in order to control seat movement is a challenge to be addressed.

In order to solve the above-mentioned challenge, this disclosure aims to know the passenger or object on the second seat. Moreover, it further contributes to the development of sustainable transportation systems.

The vehicle seat according to an embodiment of the disclosure controls the first electric device and the second electric device according to a carried object placed on the first electric seat and the second electric seat.

In the vehicle seat according to an embodiment of the disclosure, when movement of the first electric seat causes contact with the second electric seat or a passenger sitting on the second electric seat, the second electric device moves the second electric seat away from the first electric seat.

In addition to the position and posture of an electric seat, when the predetermined condition is met, the first electric seat is moved to at least one of the first predetermined position and the first predetermined posture, and the second electric seat is moved to at least one of the second predetermined position and the second predetermined posture. Since the vehicle seat controls the first electric device and the second electric device, through the interconnected operation of the first and second electric seats, diversified seat layouts in the vehicle can be realized, thereby increasing convenience.

Based on the anticipated increasing standardization of millimeter-wave radar systems installed in the upper interior of vehicles as an in-vehicle infant prevention support system, the embodiment of the disclosure distinguishes between adults and children by determining the body size of the second seat passenger, and further differentiates between children, child seats, or luggage by detecting heartbeats. Subsequently, it automatically moves the second seat forward. In addition, in the embodiment of the disclosure, the second seat is used as a memory seat, and the action settings can be customized to freely set the amount of sliding movement. Furthermore, akin to the memory function of a driver's seat, the embodiment of the disclosure provides personalized settings for each user through interconnected operation with personalized user settings, such as those associated with a remote key (FOB key) or personal assistant (PA).

Figure 1:
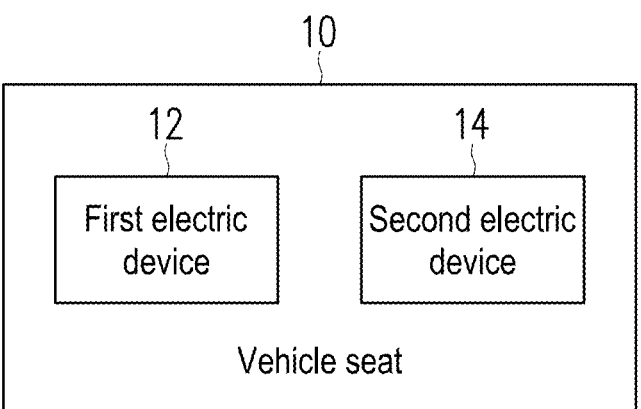
FIG. 1 is a block diagram of a vehicle seat according to an embodiment of the disclosure.

FIG. 1 is a block diagram of a vehicle seat according to an embodiment of the disclosure. Referring to FIG. 1, the vehicle seat 10 of this embodiment is, for example, installed or configured in a vehicle (not shown) to detect carried objects on each seat in the vehicle and move the seats according to the detection results. In this embodiment, the vehicle is, for example, a car using an internal combustion engine such as a diesel engine or a gasoline engine as a power source, an electric car using an electric motor as a power source, or a hybrid car having both an internal combustion engine and an electric motor.

The vehicle seat 10 includes a first electric device 12 for moving the first electric seat, and a second electric device 14 for moving the second electric seat. In some embodiments, the first electric seat is, for example, a driver's seat, and the second electric seat is, for example, a passenger's seat, but not limited thereto.

The first electric device 12 and the second electric device 14 are, for example, electric motors controlled using a relay or an integrated circuit (IC). The speed of the motor is controlled through pulse-width modulation (PWM), thereby achieving smooth operation of the motor and smooth movement of the electric seat. The movement of the electric seat includes forward and rearward sliding of the seat position, tilting of the seat back, etc., which is not limited thereto.

In some embodiments, the vehicle seat 10 further includes an in-vehicle capturing device (not shown) for detecting the carried object on the seat. The in-vehicle capturing device is, for example, a millimeter wave radar, light detection and ranging (LiDAR), sonar, ultrasonic, infrared and other sensors, or cameras or video cameras that include a charge coupled device (CCD), a complementary metal-oxide semiconductor (CMOS) device, or other types of photosensitive devices, which is not limited thereto. The in-vehicle capturing device is, for example, disposed on the dashboard, center console, rear view mirror, interior light, roof, etc. of the vehicle to capture interior images including the vehicle seat 10 and other seats.

In some embodiments, the vehicle seat 10 also includes a processing device (not shown) for controlling the operation of the first electric device 12 and the second electric device 14. The processing device is implemented, for example, by executing a program through a processor such as an electronic control unit (ECU) or a central processing unit (CPU), or through hardware such as large scale integration (LSI), application specific integrated circuit (ASIC), or field programmable gate array (FPGA). Furthermore, it may be implemented through a combination of software and hardware. This embodiment does not limit its implementation.

Figure 2:
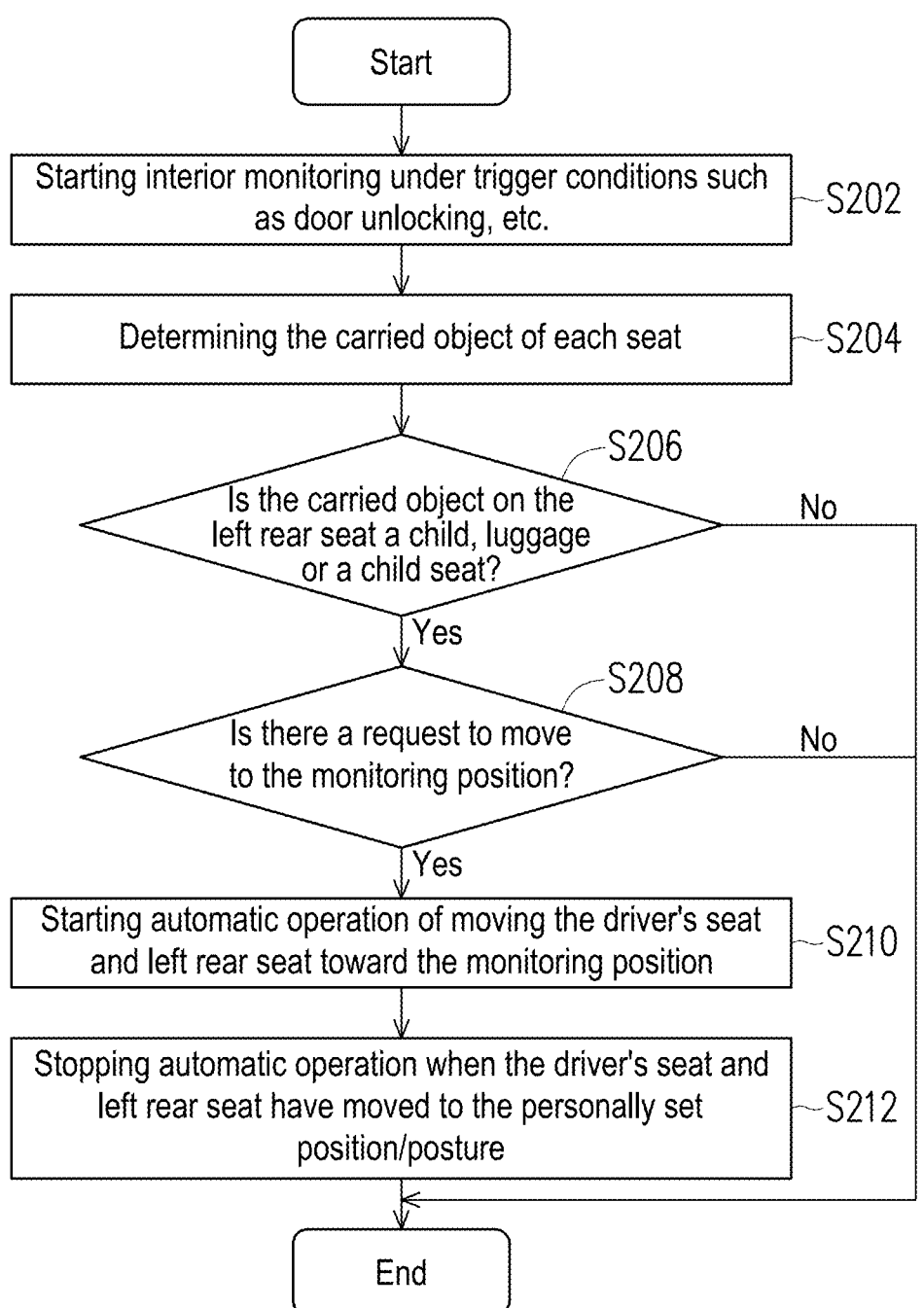
FIG. 2 is a flowchart of a method for moving seats according to an embodiment of the disclosure.

FIG. 2 is a flowchart of a method for moving seats according to an embodiment of the disclosure. Referring to FIG. 1 and FIG. 2 at the same time, the seat moving method of this embodiment is applicable to the vehicle seat 10 of FIG. 1 for moving the seat so that the child sitting on the seat is closer to the driver. Detailed steps of the seat moving method of this embodiment is described below with reference to each component in the vehicle seat 10.

In step S202, the vehicle seat 10 starts interior monitoring when trigger conditions such as door unlocking are met.

In some embodiments, the trigger condition includes detection of various trigger operations such as switch operation, display audio (DA) host operation, or voice operation. In other embodiments, the trigger condition further includes detection of vehicle key approach, detection of button signal of remote key (FOB key), detection of the driver sitting in the driver's seat, detection of the vehicle ignition starting, etc., which is not limited thereto.

In addition, in some embodiments, the vehicle seat 10 captures interior images through capturing devices such as cameras or video cameras, or detects interior objects through sensors such as millimeter-wave radar, laser radar, ultrasonic waves, infrared rays, etc., to implement interior monitoring, which is not limited thereto.

In step S204, the vehicle seat 10 determines the carried object on each seat according to the interior monitoring results. The vehicle seat 10 determines whether there is a carried object on each seat according to the recognition results, radar detection results, infrared detection results and other monitoring results of the interior images.

In step S206, the vehicle seat 10 further determines whether the carried object on the left rear seat is a child, luggage or a child seat. If it is determined that the carried object is not a child, luggage or a child seat (e.g., it is determined that the carried object is empty or an adult), the process ends. In some embodiments, the vehicle seat 10 determines whether the object is an adult or a child by detecting the shape and size of the carried object on the seat in the interior image, or determines whether the carried object is a child, a child seat, luggage or other objects by detecting the heartbeat of the carried object, which is not limited thereto.

In step S206, if it is determined that the carried object is a child, luggage or a child seat, then in step S208, the vehicle seat 10 further determines whether there is a request to move to the monitoring position. If the request to move to the monitoring position is not detected, the process ends.

In some embodiments, detection of "unlock using FOB key" may be considered as a request. In addition, the detection of using the monitoring position switch or memory seat to select one of multiple positions can also be considered as a request.

In step S208, if it is determined that there is a request to move to the monitoring position, then in step S210, automatic operation of moving the driver's seat and the left rear seat to the monitoring position starts.

In some embodiments, if there is luggage or a child seat for carrying a child in the left rear seat (the first seat), the left rear seat is moved forward to the first predetermined position and/or the first predetermined posture, and the driver's seat (the second seat) is moved rearward to the second predetermined position and/or the second predetermined posture, so that the driver can clearly see luggage or the child from the driver's seat.

In step S212, when the driver's seat and the left rear seat have moved to the personally set position/posture, the automatic operation stops. The personally set position/posture is, for example, preset by the driver and stored in the storage device of the vehicle seat 10, and the authentication of the FOB key or personal assistant is used to identify the driver's identity to select the seat position/posture suitable for the current driver to perform the movement operation on the driver's seat and the left rear seat.

Figure 3A:
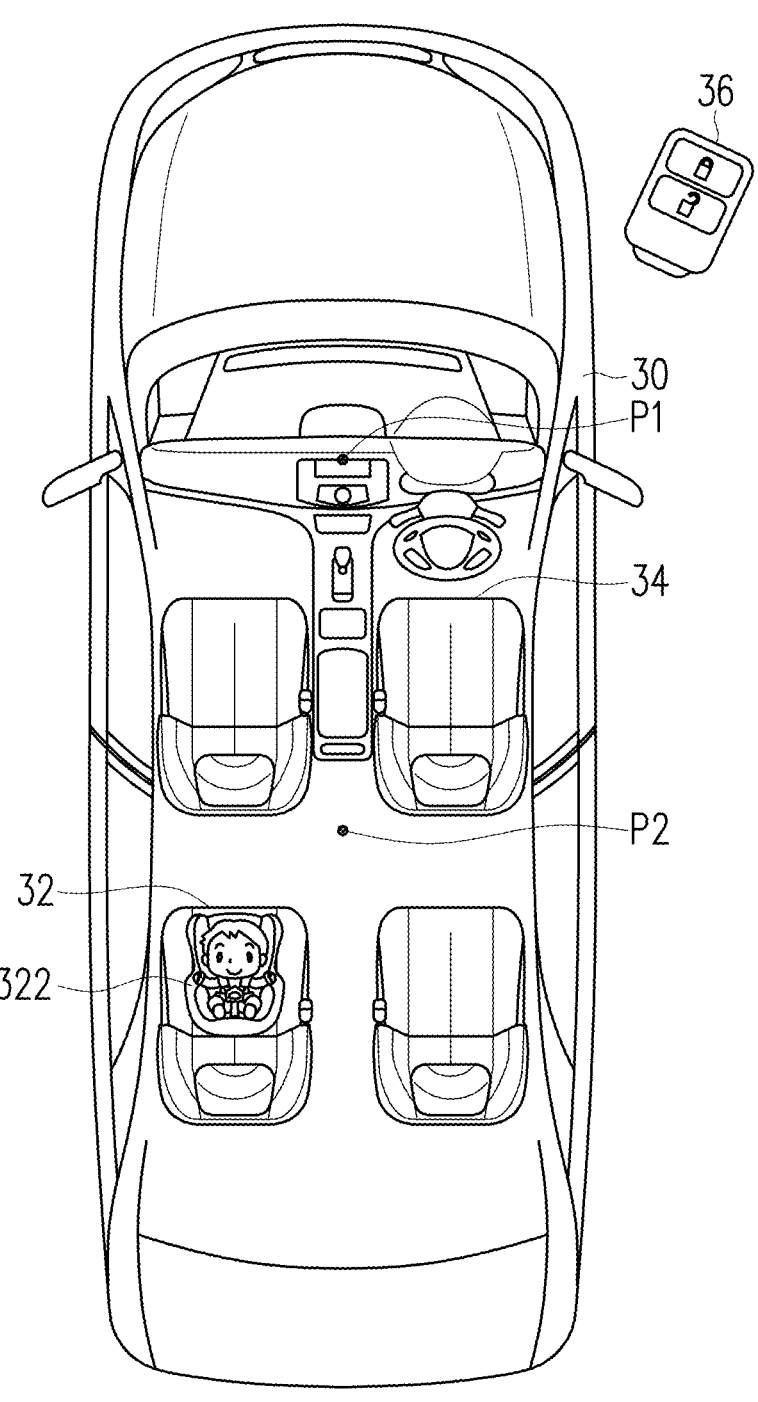
FIG. 3A and FIG. 3B are examples of moving the seats according to the first embodiment of the disclosure.
Figure 3B:
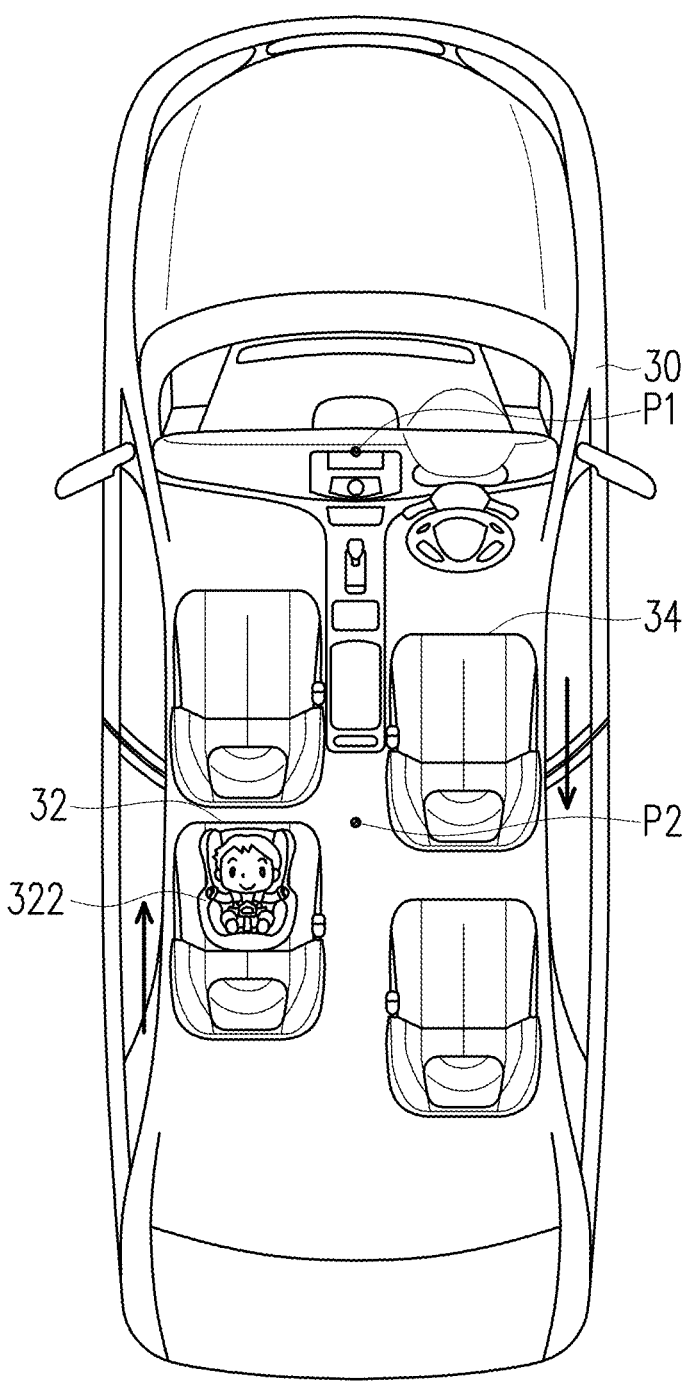

For example, FIG. 3A and FIG. 3B are examples of moving the seats according to the first embodiment of the disclosure. Referring to FIG. 3A, the first embodiment is to configure detection devices such as cameras and radars at the roof position P1 and/or the rear interior light position P2 in the vehicle 30 to detect the carried objects on the seats. Referring to FIG. 3B, when the detection device detects that there is a child seat 322 (condition 1) carrying a child in the left rear seat 32 (the first seat) and the FOB key 36 determines that a specific passenger (i.e., the driver) has driving intention (condition 2), the driver's seat 34 (the second seat) is moved rearward through the electric device. At the same time, the left rear seat 32 is moved forward through an electric device, so that the child seat 322 can be close to the driver.

In some embodiments, the driver's seat 34 is, for example, moved to a rear seat monitoring driving position (sliding position, tilt angle, height/tilt) set by the driver possessing the FOB key 36, so that the position/posture of the moved driver's seat 34 can conform to the driver's body shape or driving preference. In some embodiments, a personal assistant that uses the in-vehicle capturing device for identity authentication can also be used instead of the FOB key 36 to determine the rear seat monitoring driving position, which is not limited thereto.

Figure 4A:
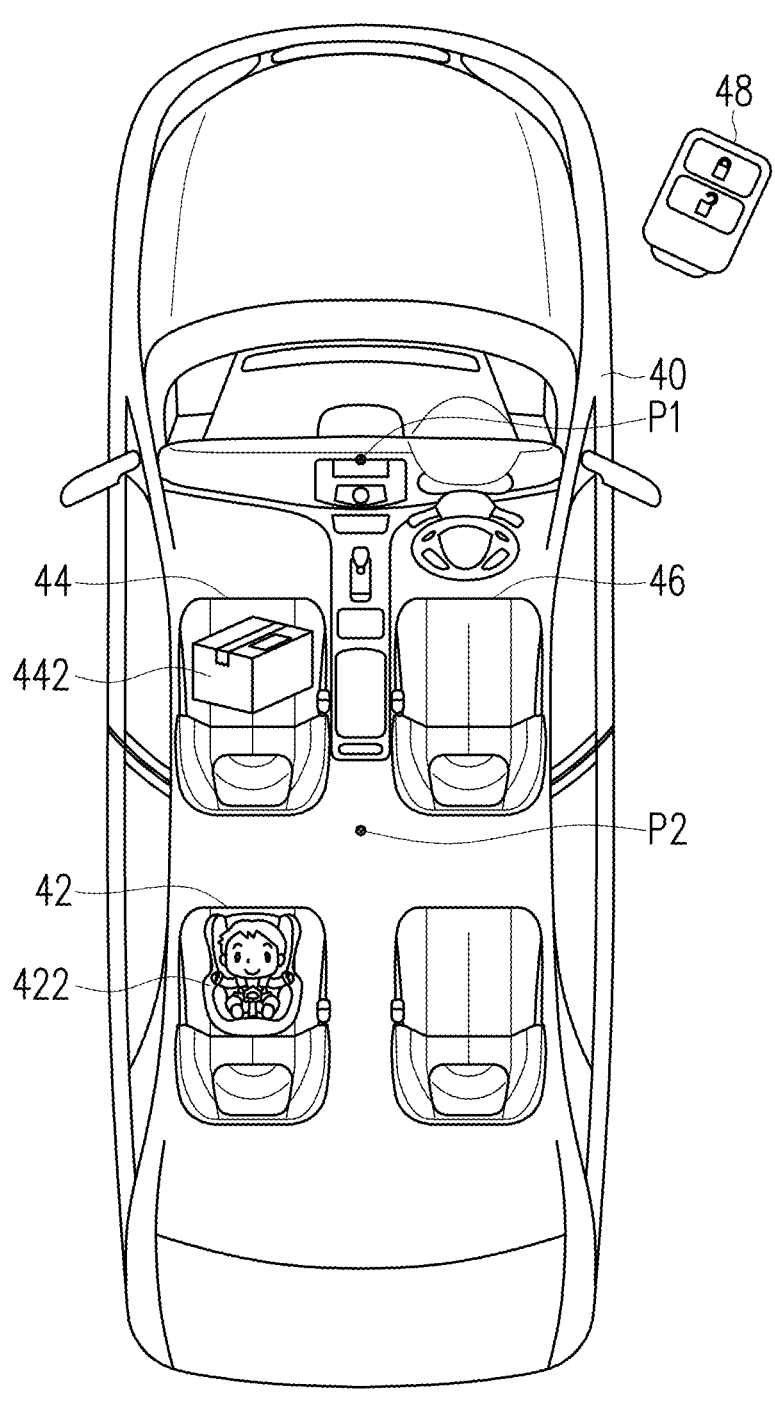
FIG. 4A and FIG. 4B are examples of moving the seats according to the second embodiment of the disclosure.
Figure 4B:
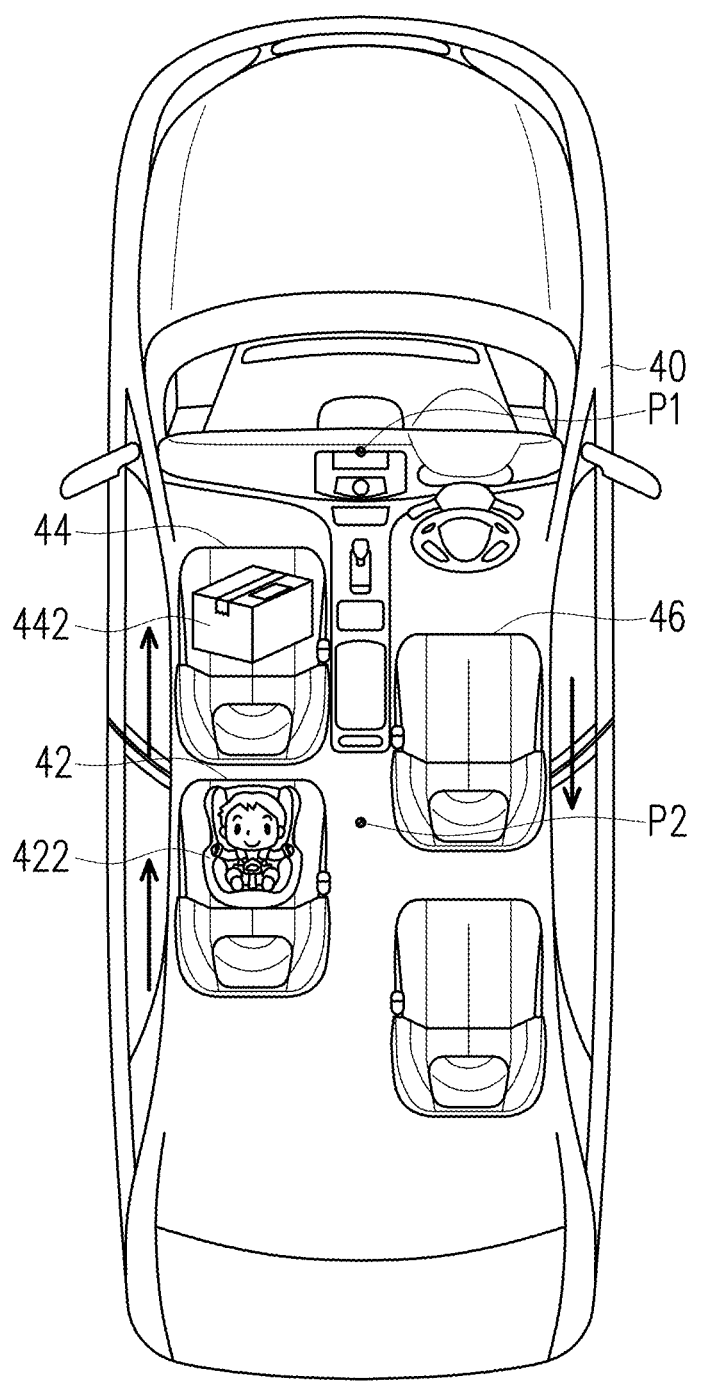

FIG. 4A and FIG. 4B are examples of moving the seats according to the second embodiment of the disclosure. Referring to FIG. 4A, the second embodiment is to configure detection devices such as cameras and radars at the roof position P1 and/or the rear interior light position P2 in the vehicle 40 to detect the carried objects on the seats. Referring to FIG. 4B, when the detection device detects that there is a child seat 422 (condition 1) carrying a child in the left rear seat 42 (the first seat), there is luggage 442 on the front passenger seat 44 (the second seat) and no other passengers is carried (condition 2), and the FOB key 48 determines that a specific passenger (i.e., the driver) has driving intention (condition 3), the front passenger seat 44 is moved forward through the electric device. At the same time, the left rear seat 42 is moved forward through an electric device, so that the child seat 422 can be close to the driver. In this embodiment, since the front passenger seat 44 (the second seat) has moved forward, the left rear seat 42 can move further forward compared with the first embodiment. In addition, even when there is no object on the front passenger seat 44 (the second seat), it can be determined that the above condition 2 is met.

In addition, in this embodiment, the driver's seat 46 is moved rearward by an electric device to a rear seat monitoring driving position (sliding position, tilt angle, height/tilt) set by the driver possessing the FOB key 48, so that the driver can be closer to the child seat 422, and the position/posture of the moved driver's seat 46 can conform to the driver's body shape or driving preference.

Figure 5A:
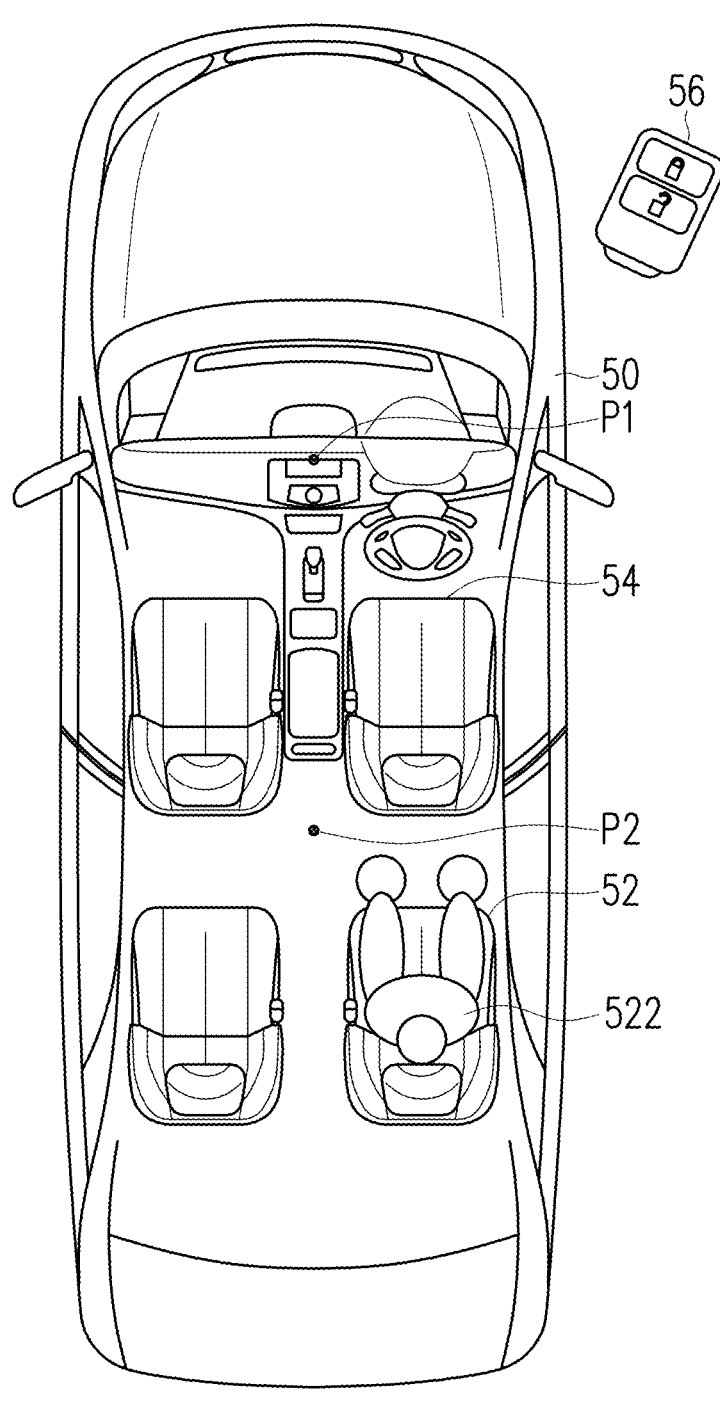
FIG. 5A and FIG. 5B are examples of moving the seats according to the third embodiment of the disclosure.
Figure 5B:
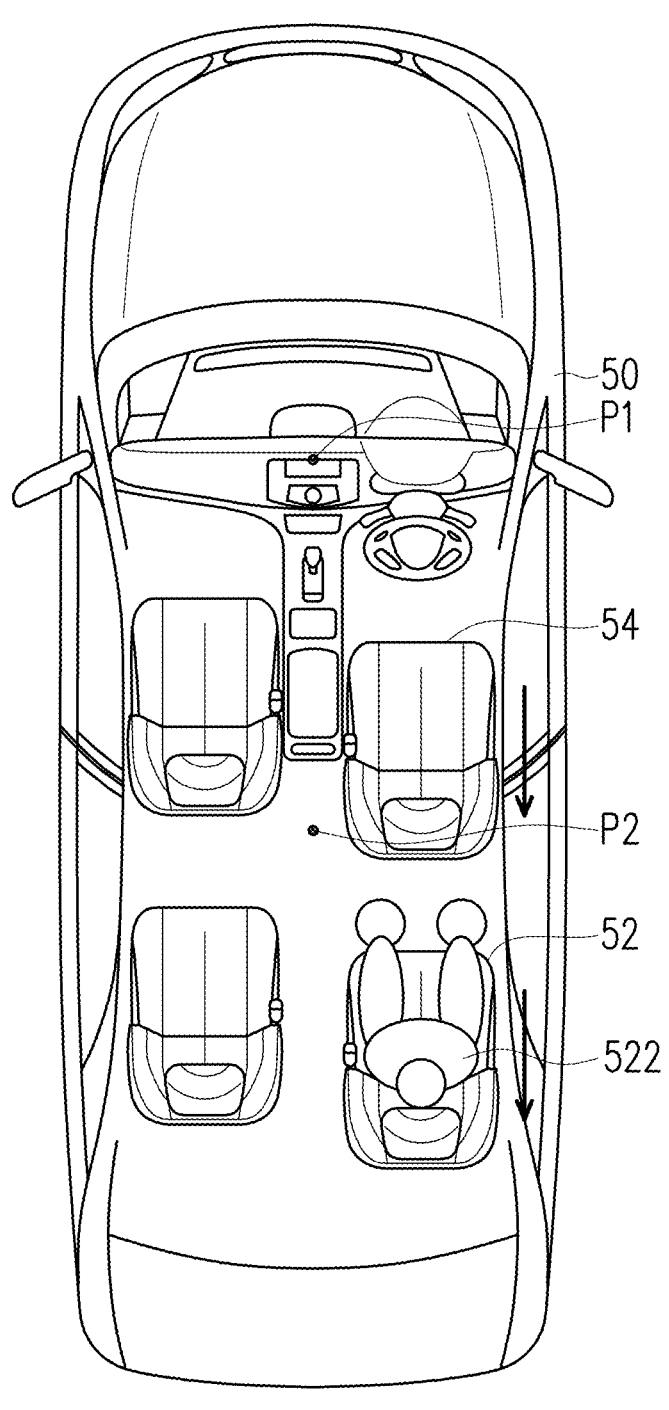

FIG. 5A and FIG. 5B are examples of moving the seats according to the third embodiment of the disclosure. Referring to FIG. 5A, the third embodiment is to configure detection devices such as cameras and radars at the roof position P1 and/or the rear interior light position P2 in the vehicle 50 to detect the carried objects on the seats. Referring to FIG. 5B, when the detection device detects that there is an adult passenger 522 (condition 1) in the right rear seat 52 (the first seat), the FOB key 56 determines that a specific passenger (i.e., the driver) has driving intention (condition 2), and it is determined that the rear seat monitoring driving position set by the specific passenger who has the FOB key

56 will squeeze the legs of the passenger in the right rear seat 52 and come into contact with the legs of the passenger in the right rear seat 52 (condition 3), the driver's seat 54 is moved rearward through an electric device. At the same time, the right rear seat 52 is moved in a direction away from the driver's seat 54 (i.e., rearward) through an electric device, so that the position/posture of the moved driver's seat 54 can conform to the driver's body shape or driving preference without squeezing the legs of the passenger in the right rear seat 52.

To sum up, the vehicle seat according to the embodiment of the disclosure determines whether the passenger of the second seat is an adult, a child, a child seat or luggage by using sensing devices such as radar and cameras. When it is determined that an adult is on the vehicle, the second seat is not moved. However, when it is determined that a child is on the vehicle, a child seat is installed, or luggage is loaded, the need to move the second seat closer to the driver's seat can be met by moving the second seat forward. In addition, by using the second seat as a memory seat, the movement settings can be customized and the amount of sliding movement can be freely set. Similar to the memory seat of the driver's seat, the personal settings can be provided for each user through interconnected operation with personalized user settings (e.g., a FOB key or personal assistant).

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A vehicle seat, comprising:

a first electric device, moving a first electric seat to at least one of a first predetermined position and a first predetermined posture inside a vehicle;

a second electric device, moving a second electric seat to at least one of a second predetermined position and a second predetermined posture inside the vehicle, wherein when a predetermined condition is met, controlling the first electric device and the second electric device according to a type of a carried object placed on the first electric seat and the second electric seat so that the first electric seat is in the at least one of the first predetermined position and the first predetermined posture and the second electric seat is in the at least one of the second predetermined position and the second predetermined posture.

2. The vehicle seat according to claim 1, wherein when movement of the first electric seat causes contact with the second electric seat or a passenger sitting on the second electric seat, the second electric device moves the second electric seat away from the first electric seat.

* * * * *